(12) United States Patent
Kelly et al.

(10) Patent No.: US 12,479,543 B2
(45) Date of Patent: Nov. 25, 2025

(54) SYSTEM FOR DISTRIBUTING BATTERY WEIGHT ON A BOAT

(71) Applicant: Brunswick Corporation, Mettawa, IL (US)

(72) Inventors: Brennan J. Kelly, Urbana, IL (US); John N. Oenick, Madison, WI (US); Eric J. Rego, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 663 days.

(21) Appl. No.: 17/882,764

(22) Filed: Aug. 8, 2022

(65) Prior Publication Data

US 2024/0043104 A1     Feb. 8, 2024

(51) Int. Cl.
*B63B 39/02*     (2006.01)
*B63B 43/08*     (2006.01)

(52) U.S. Cl.
CPC .............. *B63B 39/02* (2013.01); *B63B 43/08* (2013.01); *B63B 2209/00* (2013.01)

(58) Field of Classification Search
CPC ......... B63B 39/00; B63B 39/02; B63B 43/00; B63B 43/08; B63B 35/00; B63B 1/00
USPC ............................................. 114/124; 440/6
See application file for complete search history.

(56) References Cited

U.S. PATENT DOCUMENTS

| | | | |
|---|---|---|---|
| 6,073,569 A | 6/2000 | Motsenbocker et al. | |
| 6,273,015 B1 | 8/2001 | Motsenbocker et al. | |
| 6,571,722 B2 | 6/2003 | Motsenbocker et al. | |
| 6,973,847 B2 | 12/2005 | Adams et al. | |
| 7,263,945 B2 * | 9/2007 | Little ...................... | B63B 17/02 114/61.1 |
| 9,038,554 B2 * | 5/2015 | de Troz ................... | B63B 39/02 114/124 |
| 9,150,291 B2 * | 10/2015 | Dollar ..................... | B63B 43/08 |
| 11,572,140 B2 * | 2/2023 | Corcoran ................ | B63B 43/08 |
| 2014/0033961 A1 | 2/2014 | de Troz | |
| 2016/0097393 A1 | 4/2016 | Hartman | |

(Continued)

FOREIGN PATENT DOCUMENTS

| | | |
|---|---|---|
| CN | 106828843 A | 6/2017 |
| CN | 107117266 A | 9/2017 |

(Continued)

OTHER PUBLICATIONS

Extended European Search Report in corresponding European Application No. 23190000.2, dated Jan. 5, 2024, 9 pages.

(Continued)

*Primary Examiner* — Lars A Olson
(74) *Attorney, Agent, or Firm* — Andrus Intellectual Property Law, LLP

(57) ABSTRACT

A system for a boat includes a first guideway installed under a main deck of the boat, a first battery pack coupled to the first guideway under the main deck, and a first actuator configured to move the first battery pack along the first guideway. A controller is electrically and/or signally coupled with the first actuator. A user input device is electrically and/or signally coupled with the controller. The controller is configured to control the first actuator to move the first battery pack along the first guideway in response to an input to the user input device so as to relocate the weight of the first battery pack under the main deck.

23 Claims, 11 Drawing Sheets

(56) References Cited

U.S. PATENT DOCUMENTS

2021/0300507 A1 9/2021 Corcoran
2023/0249795 A1 8/2023 Breyer

FOREIGN PATENT DOCUMENTS

| | | |
|---|---|---|
| CN | 105711782 B | 6/2018 |
| CN | 108482623 A | 9/2018 |
| CN | 108974287 A | 12/2018 |
| CN | 109178266 A | 1/2019 |
| CN | 111634396 A | 9/2020 |
| CN | 113002741 A | 6/2021 |
| KR | 10-2014-0014975 A | 2/2014 |
| KR | 10-2020-0061936 A | 6/2020 |
| WO | 2022125522 A1 | 6/2022 |

OTHER PUBLICATIONS

Seakeeper Inc., Seakeeper Brochure, 2022, 14 pages (admitted prior art).

Gonring, Steven J., "Watertight Marine Battery," U.S. Appl. No. 17/383,979, filed Jul. 23, 2021 (drawings, specification, and claims only).

Oenick et al., "Marine Battery Safety System and Method," U.S. Appl. No. 17/716,745, filed Apr. 8, 2022 (drawings, specification, and claims only).

Mueller et al., "Marine Battery Safety System and Method," U.S. Appl. No. 17/716,732, filed Apr. 8, 2022 (drawings, specification, and claims only).

PBC Linear, "1RPS (Inch) High Profile Simplicity Linear Slide Assembly," website, available at https://www.pbclinear.com/Products/Actuators/Simplicity-Linear-Slide-Assemblies/1RPS-Inch-High-Profile-Simplicity-Linear-Slide, last accessed Aug. 8, 2022 (admitted prior art).

Cheesy Cam, "Dual Rail Video Camera Track Dolly Slider," website, Aug. 1, 2012, available at https://cheesycam.com/dual-rail-video-camera-track-dolly-slider/, last accessed Aug. 8, 2022.

* cited by examiner

SYSTEM FOR DISTRIBUTING BATTERY WEIGHT ON A BOAT

FIELD

The present disclosure relates to boats that are equipped with electrically-powered marine propulsion devices.

BACKGROUND

U.S. Patent Application Publication No. 2022/0328912 discloses a marine battery system configured to provide energy to a marine vessel load. The marine battery system includes a main enclosure body and an auxiliary enclosure body that is detachably coupled to the main enclosure body to define a sealed battery volume. The auxiliary enclosure body is configured to perform a pressure accommodation action responsive to an increase in a temperature within the sealed battery volume. The marine battery system further includes a battery disposed within the sealed battery volume.

U.S. Patent Application Publication No. 2022/0328893 discloses a marine battery pack including an enclosure defining a cavity, a plurality of cell modules within the cavity, each comprising a plurality of battery cells, and at least one sensor configured to sense at least one of a temperature, a pressure, a presence of water, and a gas content within the cavity. A controller is configured to detect an event warranting decommission of the battery pack based on the temperature, the pressure, the presence of water, and/or the gas content within the cavity, and then to automatically operate a pump to intake water from outside of the enclosure and pump water through the cavity from an inlet port in the enclosure to an outlet port in the enclosure so as to cool the plurality of battery cells.

U.S. Patent Application Publication No. 2022/0328943 discloses a marine battery pack including a battery enclosure having an exterior and an interior defining a cavity, wherein the battery enclosure is configured to protect against water ingress into the cavity. The marine battery pack further comprises a plurality of cell modules within the cavity, each including a plurality of battery cells, and at least one exterior sensor on the battery enclosure configured to sense at least one of an exterior temperature, an exterior pressure, and a presence of water on the exterior of the battery enclosure. A controller is configured to identify a water exposure event based on the at least one of the exterior temperature, the exterior pressure, and the presence of water on the exterior of the battery enclosure. A water exposure response is then generated.

The above patent applications are hereby incorporated by reference herein in their entireties.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a boat comprises a main deck, a first guideway installed under the main deck, and a first battery pack coupled to the first guideway under the main deck. A first actuator is configured to move the first battery pack along the first guideway so as to relocate the weight of the first battery pack under the main deck.

According to another example of the present disclosure, a system for a boat comprises a first guideway installed under a main deck of the boat, a first battery pack coupled to the first guideway under the main deck, and a first actuator configured to move the first battery pack along the first guideway. A controller is electrically and/or signally coupled with the first actuator. A user input device is electrically and/or signally coupled with the controller. The controller is configured to control the first actuator to move the first battery pack along the first guideway in response to an input to the user input device so as to relocate the weight of the first battery pack under the main deck.

In one example of the boat and system therefor, a second guideway is installed under the main deck of the boat and a second battery pack is coupled to the second guideway. A second actuator is configured to move the second battery pack along the second guideway. In an example of a system including a controller, the controller is configured to control the second actuator to move the second battery pack along the second guideway in response to the input to the user input device so as to relocate the weight of the second battery pack under the main deck.

In one example of the boat and system therefor, the first and second guideways and the first and second actuators are configured for movement of the respective first and second battery packs in a fore-aft direction of the boat.

In another example of the boat and system therefor, the first guideway and the first actuator are configured for movement of the first battery pack in a fore-aft direction of the boat, and the second guideway and the second actuator are configured for movement of the second battery pack in a port-starboard direction of the boat.

In one example of the boat and system therefor, the boat includes a pair of hulls supporting the main deck. The first guideway and first battery pack are located within a first hull of the pair of hulls. The second guideway and the second battery pack are located within a second hull of the pair of hulls.

In another example of the boat and system therefor, a platform is located below the main deck and a pair of hulls supports the platform. The first and second guideways and the first and second battery packs are located between the platform and the main deck.

In one example of the boat and system therefor, a stationary power distribution box is electrically connected to the first battery pack. A first electrical cable couples the first battery pack to the power distribution box, and first cable maintenance means control movement of the first electrical cable as the first battery pack moves along the first guideway.

In one example of the boat and system therefor, a user input device is electrically and/or signally coupled with the first actuator. The first actuator is configured to move the first battery pack along the first guideway in response to an input to the user input device.

In one example of the boat and system therefor, the boat includes a controller electrically and/or signally coupled with the user input device and with the first actuator and an attitude sensor electrically and/or signally coupled with the controller. The attitude sensor provides information related to an angle of the main deck with respect to a stationary plane. The controller is configured to control the first actuator to move the first battery pack along the first guideway in response to the input to the user input device and in response to the information from the attitude sensor.

In one example of the boat and system therefor, a step-down converter is electrically coupled between the first battery pack and the first actuator. The first actuator is powered by the first battery pack. A marine propulsion device on the boat is also powered by the first battery pack.

BRIEF DESCRIPTION OF THE DRAWINGS

The present disclosure is described with reference to the following Figures. The same numbers are used throughout the Figures to reference like features and like components.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "back," "left," "right," "lateral" or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements from another.

Figure 1:
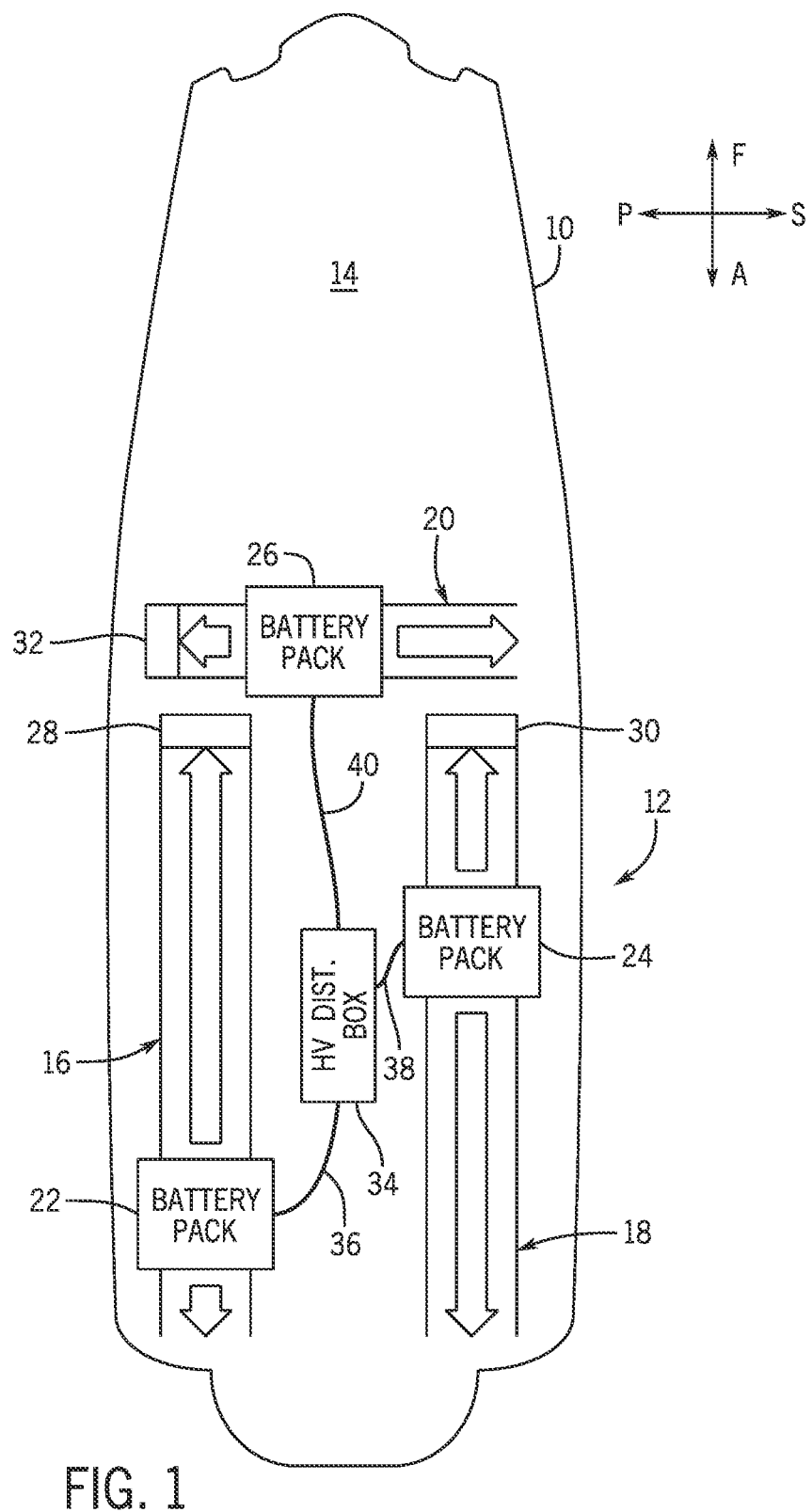
FIG. 1 is a schematic of a top view of a boat having a system according to the present disclosure installed thereon, the system including three battery packs below a deck of the boat.
Figure 2:
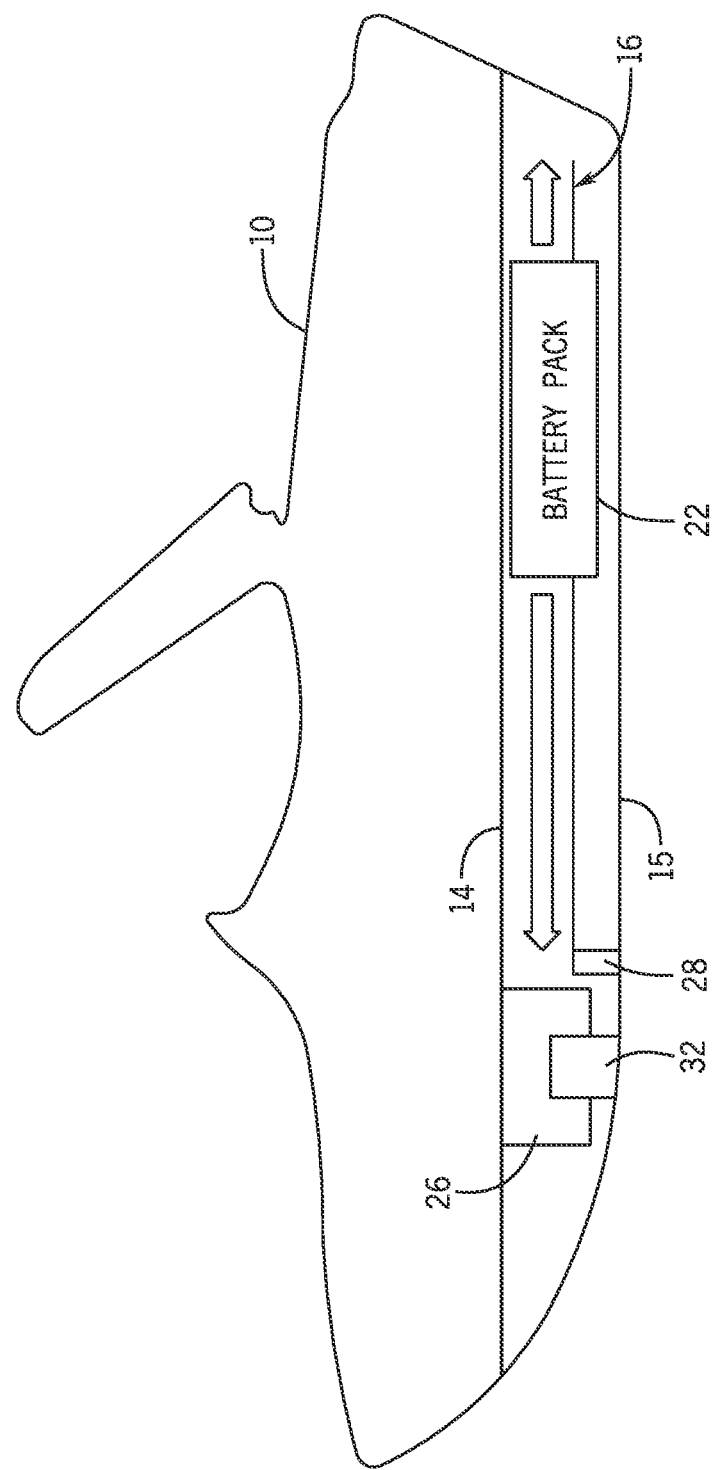
FIG. 2 is a schematic of a cross-sectional side view of the boat of FIG. 1.

FIG. 1 is a schematic illustration of a top view of a boat 10 having a system 12 according to the present disclosure installed thereon, while FIG. 2 is a side cross-sectional view thereof. In the present example, the boat 10 is a wakeboat, but it could be any other type of motorboat with a monohull. The boat 10 comprises a main deck 14 and a first guideway 16 installed under the main deck 14. A second guideway 18 is also installed under the main deck 14. An optional third guideway 20 may also be installed under the main deck 14. A first battery pack 22 is coupled to the first guideway 16 under the main deck 14, a second battery pack 24 is coupled to the second guideway 18, and an optional third battery pack 26 may be coupled to the third guideway 20. As will be described further herein below, a first actuator 28 is configured to move the first battery pack 22 along the first guideway 16 so as to relocate the weight of the first battery pack 22 under the main deck 14. Similarly, a second actuator 30 is configured to move the second battery pack 24 along the second guideway 18, also to relocate the weight of the second battery pack 24 under the main deck 14. An optional third actuator 32 is configured to move the third battery pack 26 along the third guideway 20.

As shown by the arrows and key in FIGS. 1 and 2, the first and second guideways 16, 18 and the first and second actuators 28, 30 are configured for movement of the respective first and second battery packs 22, 24 in a fore-aft direction of the boat 10. The first and second guideways 16, 18 are installed parallel to and on either side of the fore/aft centerline of the boat 10. The third guideway 20 and the third actuator 32 are configured for movement of the third battery pack 26 in a port-starboard direction of the boat 10. The third guideway 20 is installed about halfway to a third of the way from the fore end of the boat 10 to the aft end thereof.

FIG. 1 also shows a stationary power distribution box 34 electrically connected to the first battery pack 22, the second battery pack 24, and the third battery pack 26. A first electrical cable 36 couples the first battery pack 22 to the power distribution box 34. Because the power distribution box 34 is stationary and the first battery pack 22 is movable, first cable maintenance means (to be discussed in more detail below) are provided to control movement of the first electrical cable 36 as the first battery pack 22 moves along the first guideway 16. Likewise, a second electrical cable 38 provided with second cable maintenance means couples the second battery pack 24 to the power distribution box 34, and a third electrical cable 40 provided with third cable maintenance means couples the third battery pack 26 to the power distribution box 34. The power distribution box 34 handles distribution of power on the boat 10, including to devices at the helm and to electrically-powered marine propulsion devices (see 1182, FIG. 11) that produce thrust to propel the boat 10 through water.

All of the above-noted guideways 16, 18, 20, battery packs 22, 24, 26, actuators 28, 30, 32, electrical cables 36, 38, 40, and power distribution box 34 are installed in a space between the main deck 14 and the hull 15 of the boat 10. Thus, note the components installed below the main deck 14 are shown in FIG. 1, but would be hidden in reality. Depending on the size and type of boat 10, the extent of the guideways 16, 18, 20 and the size and shape of the actuators 28, 30, 32 and battery packs 22, 24, 26, the boat 10 may need to be modified (if a retrofit) or designed specifically to accommodate movement of the battery packs 22, 24, 26 in this space.

Installation of the guideways 16, 18, 20, control over the actuators 28, 30, 32, and some practical applications of the system 12 will be described herein below. Beforehand, however, several other configurations of similar systems will be discussed with respect to FIGS. 3-8.

Figure 3:
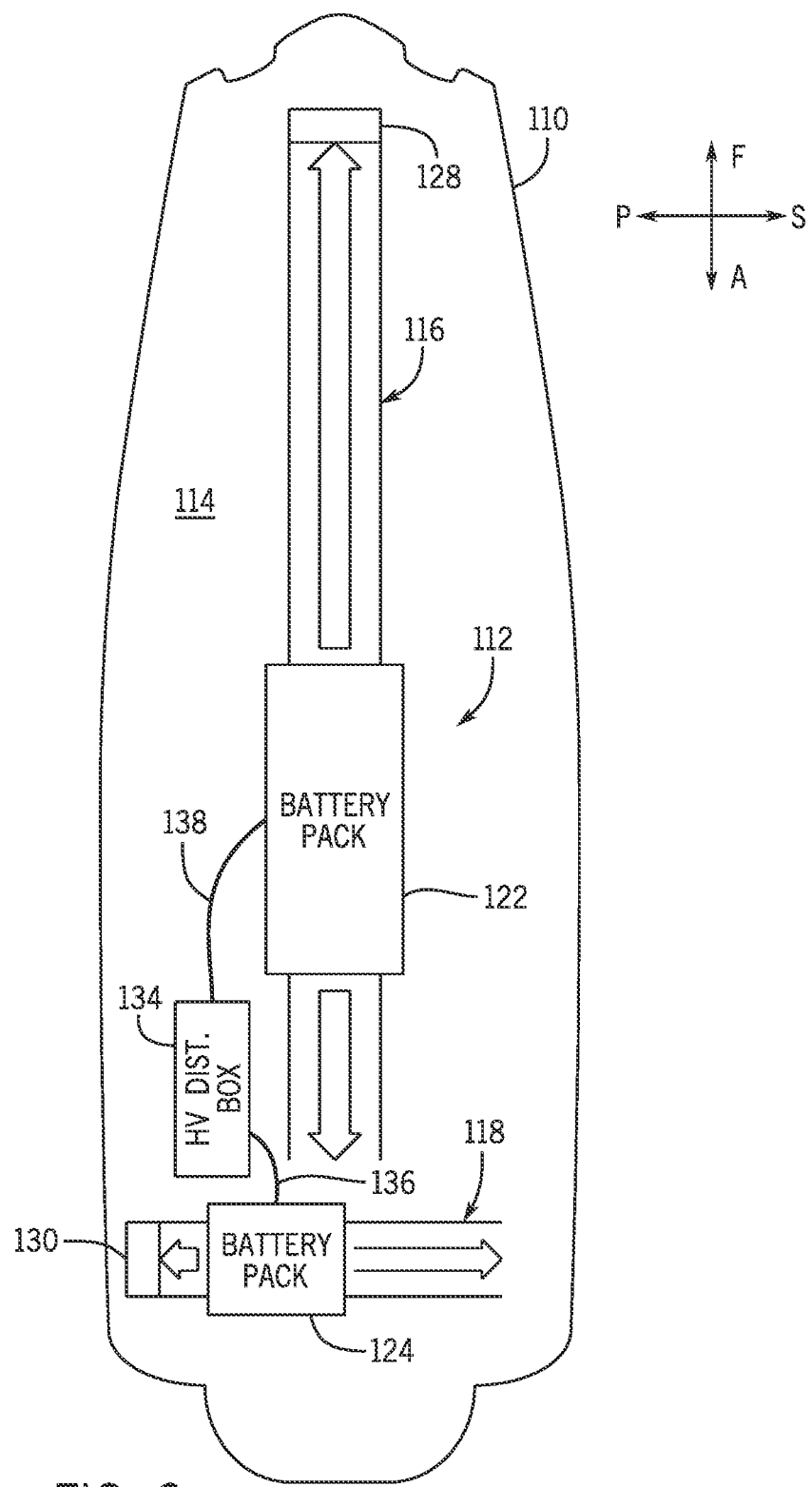
FIG. 3 is a schematic of a top view of a boat having a system according to the present disclosure installed thereon, the system having a different configuration with two battery packs below the deck of the boat.
Figure 4:
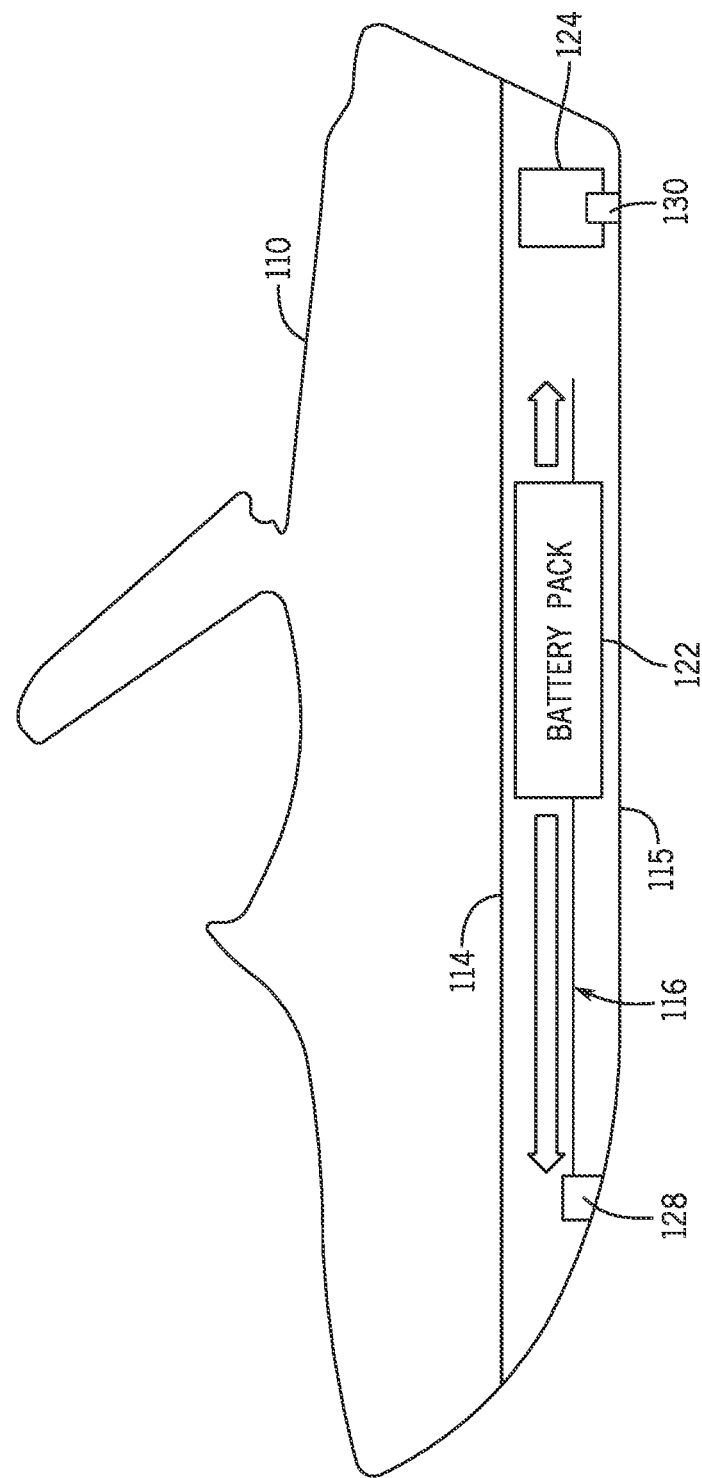
FIG. 4 is a schematic of a cross-sectional side view of the boat of FIG. 3.

FIG. 3 is a schematic of a top view of a boat 110 having a system 112 with a different configuration installed thereon, and FIG. 4 is a side cross-sectional view thereof. The system 112 includes a first guideway 116 installed under a main deck 114 of the boat 110, a first battery pack 122 coupled to the first guideway 116 under the main deck 114, and a first actuator 128 configured to move the first battery pack 122 along the first guideway 116. The system 112 also includes a second guideway 118 installed under the main deck 114, a second battery pack 124 coupled to the second guideway 118, and a second actuator 130 configured to move the second battery pack 124 along the second guideway 118. As shown by the arrows and the key, the first guideway 116 and the first actuator 128 are configured for movement of the first battery pack 122 in a fore-aft direction of the boat 110. The second guideway 118 and the second actuator 130 are configured for movement of the second battery pack 124 in a port-starboard direction of the boat 110. In contrast to the configuration of the system 12 of FIGS. 1 and 2, the system 112 of FIGS. 3 and 4 has only two movable battery packs 122, 124. The first movable battery pack 122 moves along the first guideway 116, which is installed generally along the fore/aft centerline of the boat 110. The second movable battery pack 124 moves along the second guideway 118, which is installed at the aft end of the boat 110. The first battery pack 124 is coupled to a power distribution box 134 by a first electrical cable 136 provided with first cable maintenance means. The second battery pack 122 is coupled to the power distribution box 134 by a second electrical cable 138 provided with second cable maintenance means. In this example, like in that of FIGS. 1 and 2, the noted components are installed in the space between the main deck 114 and the hull 115 of the boat 110.

Figure 5:
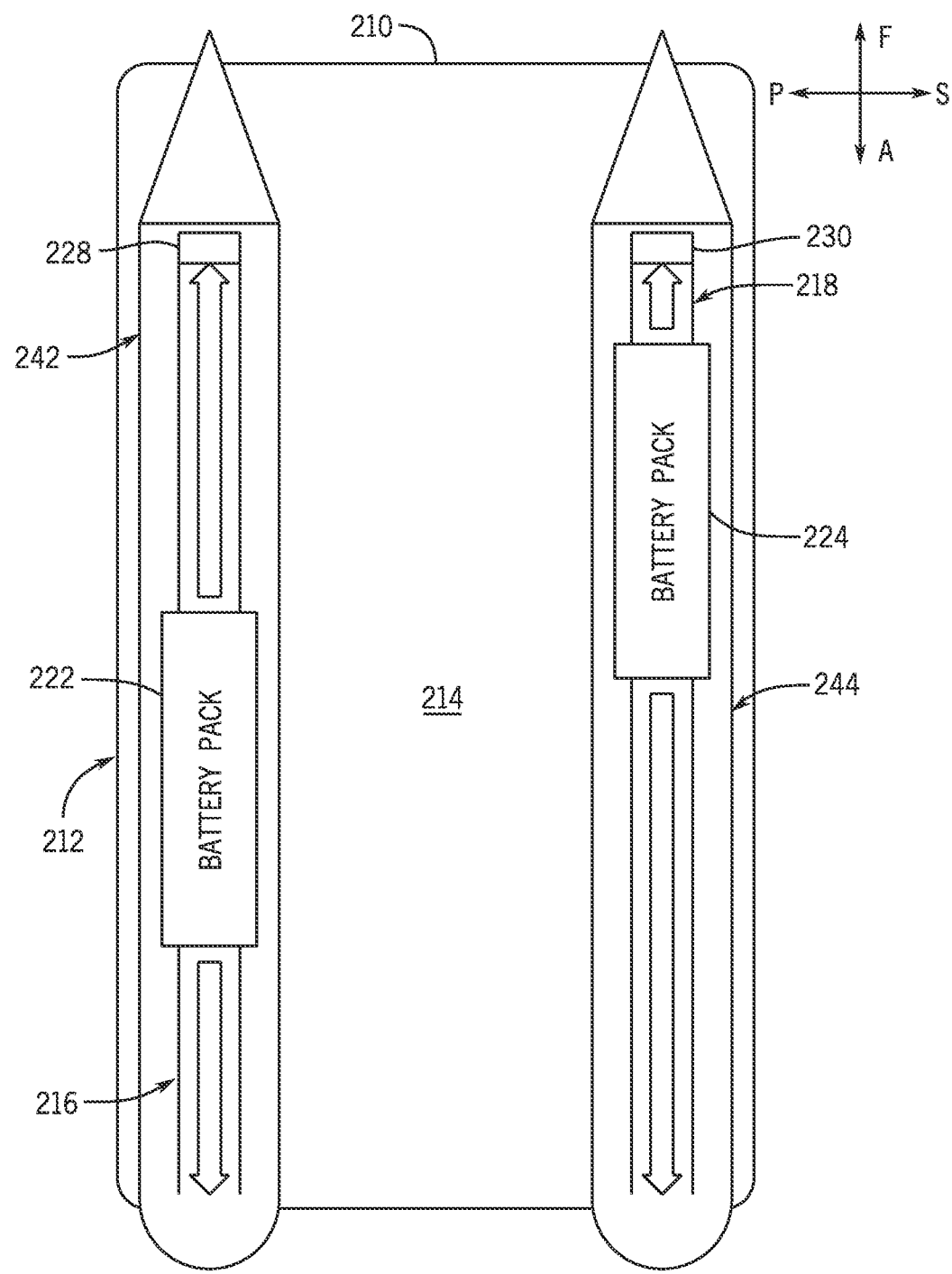
FIG. 5 is a schematic of a top view of another type of boat having a system according to the present disclosure installed thereon, the system including two battery packs, each installed in a respective hull supporting the boat.
Figure 6:
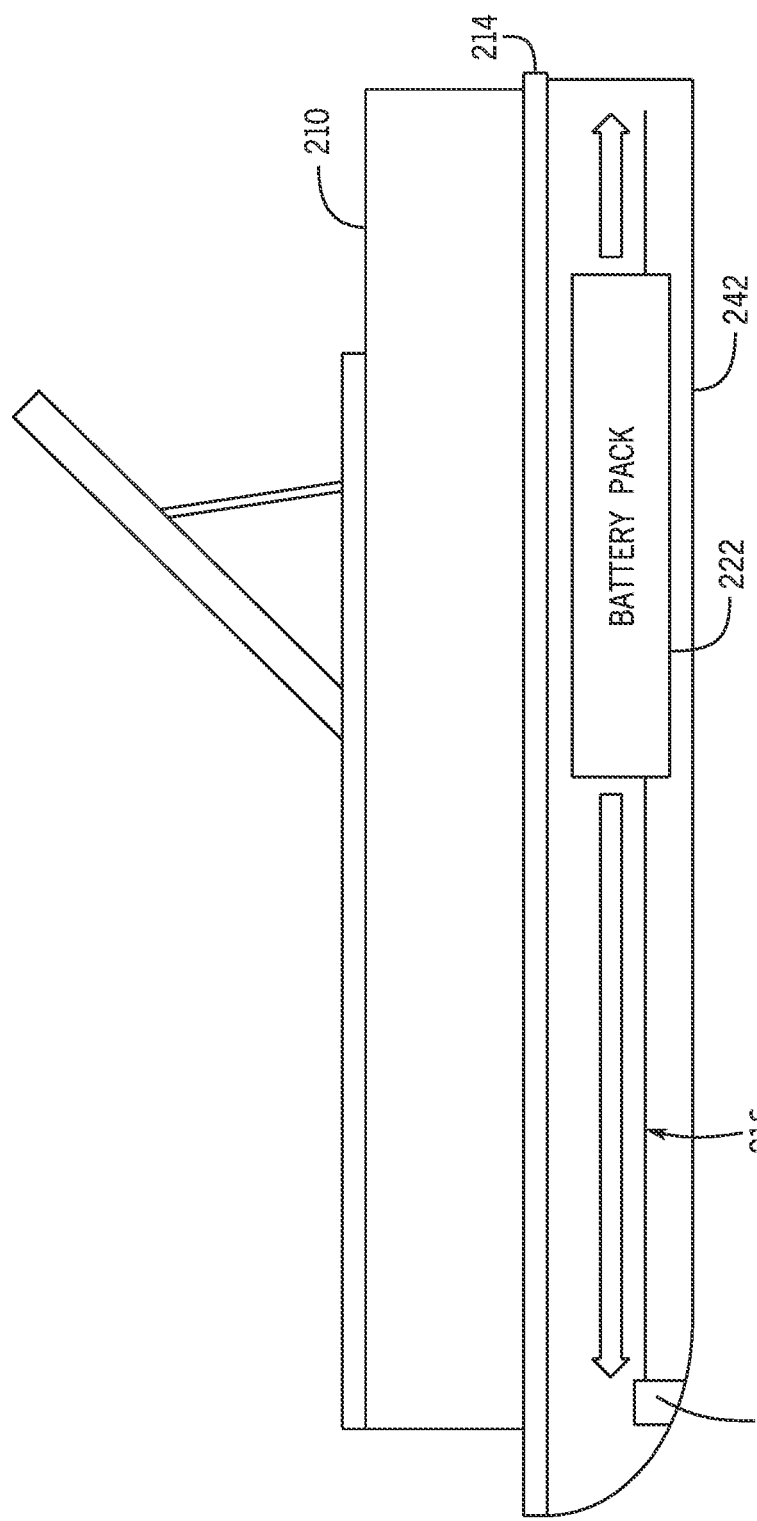
FIG. 6 is a schematic of a cross-sectional side view of the boat of FIG. 5.

FIG. 5 is a schematic of a top view of another type of boat 210 having a system 212 according to the present disclosure installed thereon, and FIG. 6 is a side cross-sectional view thereof. The system 212 includes a first guideway 116, first battery pack 222, and first actuator 228 and a second guideway 118, second battery pack 224, and second actuator 230 installed under the main deck 214. Similar to the configuration of FIG. 1, the first and second guideways 216, 218 and the first and second actuators 228, 230 are configured for movement of the respective first and second battery packs 222, 224 in a fore-aft direction of the boat 210, as shown by the arrows and the key. However, in contrast to the boats 10 and 110 of FIGS. 1 and 3, the boat 210 of FIGS. 5 and 6 further includes a pair of hulls supporting the main deck 214. The boat 210 can be, for example, a pontoon, a tritoon, or a catamaran. The first guideway 116 and first battery pack 222 are located within a first hull 242 of the pair of hulls. The second guideway 218 and the second battery pack 224 are located within a second hull 244 of the pair of hulls. Thus, the battery packs 222, 224 move within the hollow space of the hulls 242, 244 instead of in a space between the main deck 14, 114 and the monohull 15, 115 of the boat 10, 110, as in the examples of FIGS. 1-4. Although not shown herein, the battery packs 222, 224 could be coupled to a power distribution box located in one of the hulls 242, 244 or on or below the main deck 214 by way of electrical cables provided with cable maintenance means. In other examples, a power distribution box is provided in each hull 242, 244, or the battery packs 222, 224 are directly electrically connected to electrical loads such as one or more marine propulsion devices.

Figure 7:
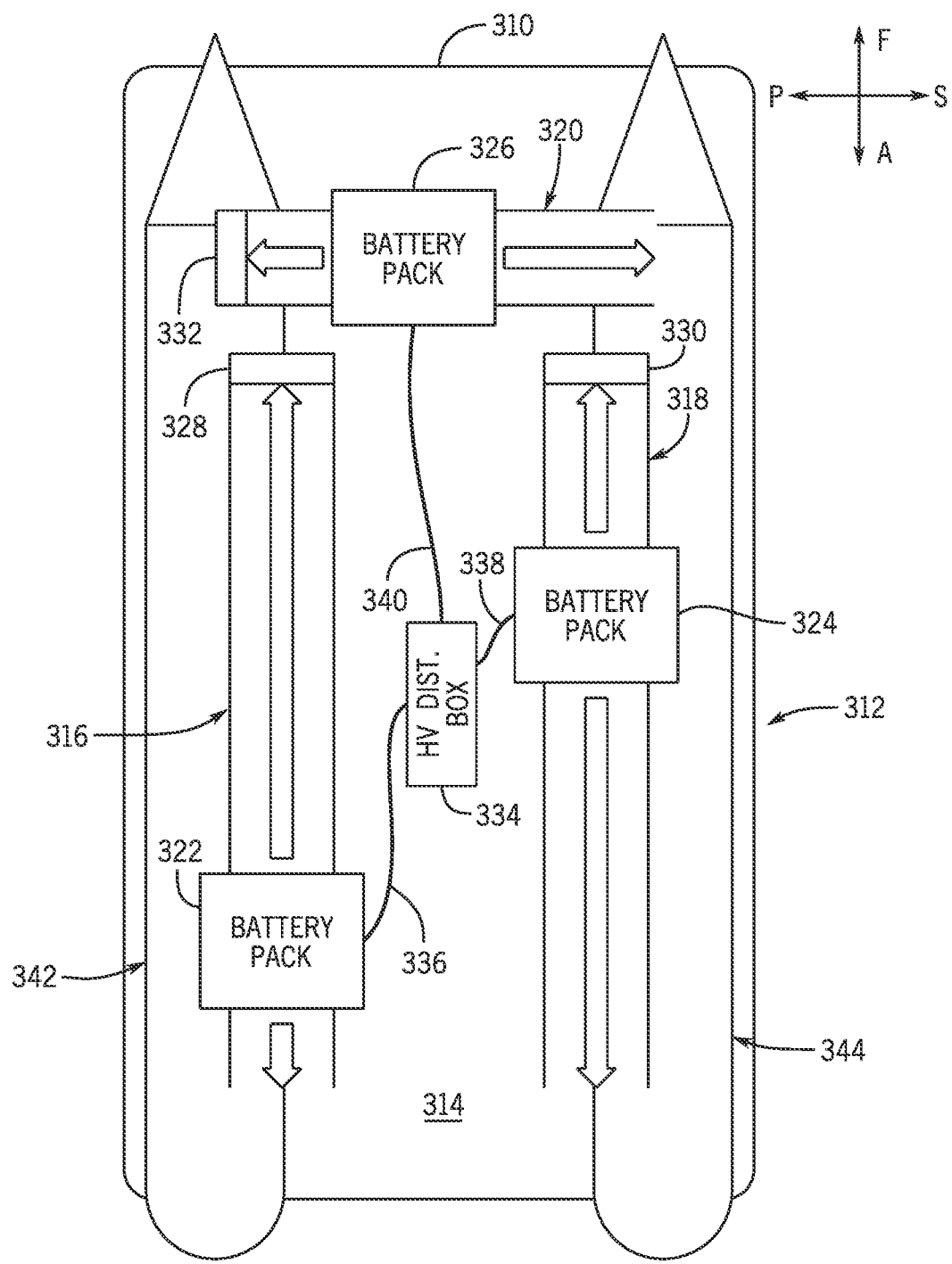
FIG. 7 is a schematic of a top view of yet another boat having yet another configuration of a system according to the present disclosure installed thereon, the system being installed on a platform located between the deck of the boat and the hulls supporting the boat.
Figure 8:
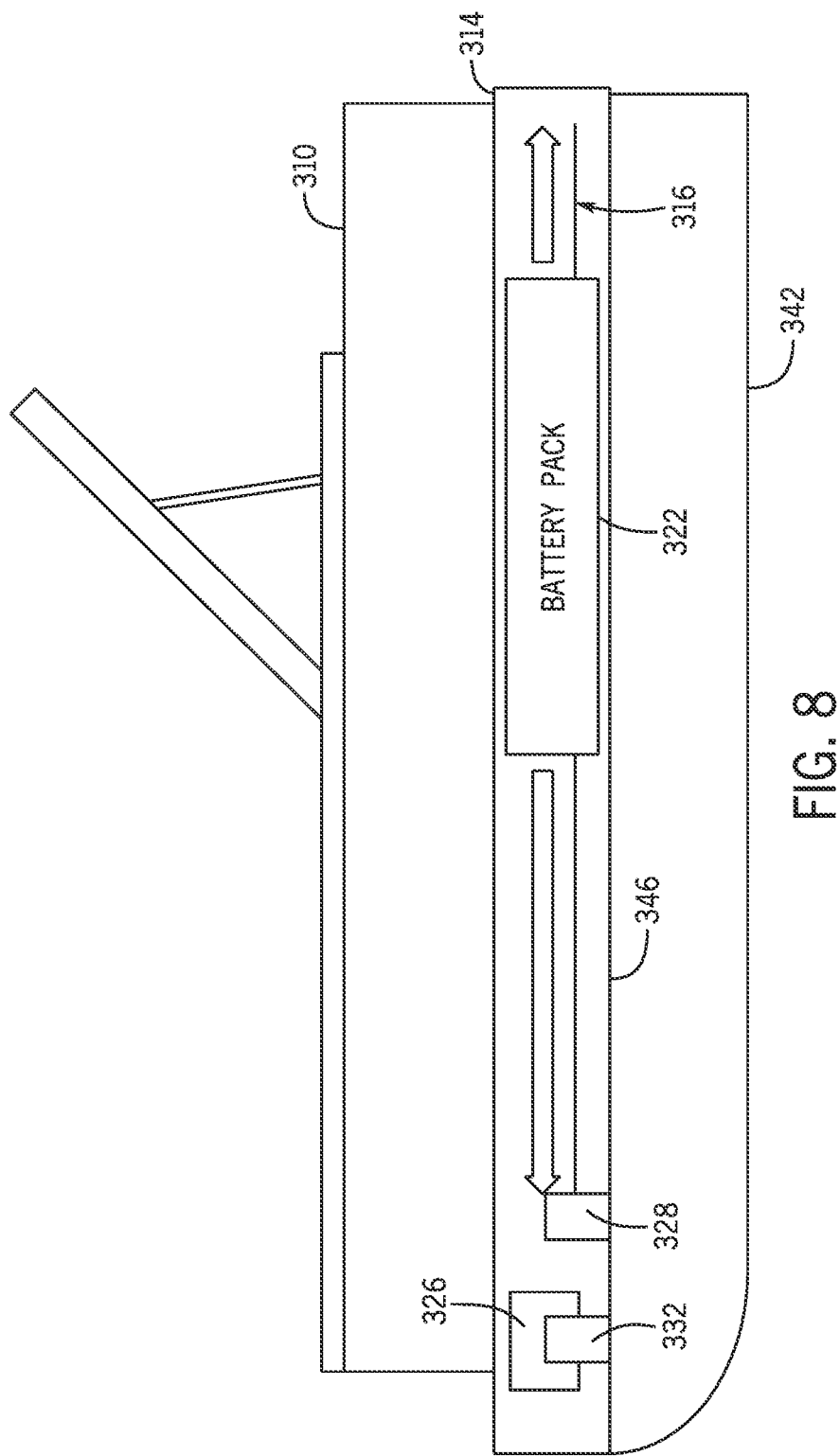
FIG. 8 is a schematic of a cross-sectional side view of the boat of FIG. 7.

FIG. 7 is a schematic of a top view of yet another boat 310 having yet another configuration of a system 312 according to the present disclosure installed thereon, and FIG. 8 is a cross-sectional side view thereof. The boat 310 is the same as the boat 210 in FIGS. 5 and 6, only a platform 346 is located below the main deck 314. The platform 346 can be connected to the main deck 314 by a series of girders, trusses, or other similar structural members. A pair of hulls 342, 344 support the platform 346 and are connected to the platform 346 in the manner pontoon hulls are typically connected to the main deck of a boat. The system 312 includes a first guideway 316, first battery pack 322, and first actuator 328 and a second guideway 318, second battery pack 324, and second actuator 330 installed under the main deck 314. More specifically, the first and second guideways 316, 318 and the first and second battery packs 322, 324 are located between the platform 346 and the main deck 314. The first and second guideways 316, 318 and the first and second actuators 328, 330 are configured for movement of the respective first and second battery packs 322, 324 in a fore-aft direction of the boat 310. An optional third guideway 320, third battery pack 326, and third actuator 332 may also be installed between the platform 346 and the main deck 314. The third guideway 320 and the third actuator 332 are configured for movement of the third battery pack 326 in a port-starboard direction of the boat 310. In comparison to the example of FIGS. 5 and 6, the example of FIGS. 7 and 8, by virtue of the platform 346, allows for potentially easier construction and maintenance of the system 312, as well as provides a place to locate the third battery pack 326 and associated components. The platform 346 also provides a place to install a power distribution box 334 and the electrical cables 336, 338, 340 (and any associated cable maintenance means) in a protected area.

In another example, instead of pure longitudinal fore-aft movement and/or pure lateral port-starboard movement, the guideways are configured for different directions of movement. For example, the guideways could extend diagonally across the boat 10. In another example, a guideway is installed to provide for an arcing movement of one or more battery pack(s) along the perimeter of the hull.

Figure 9:
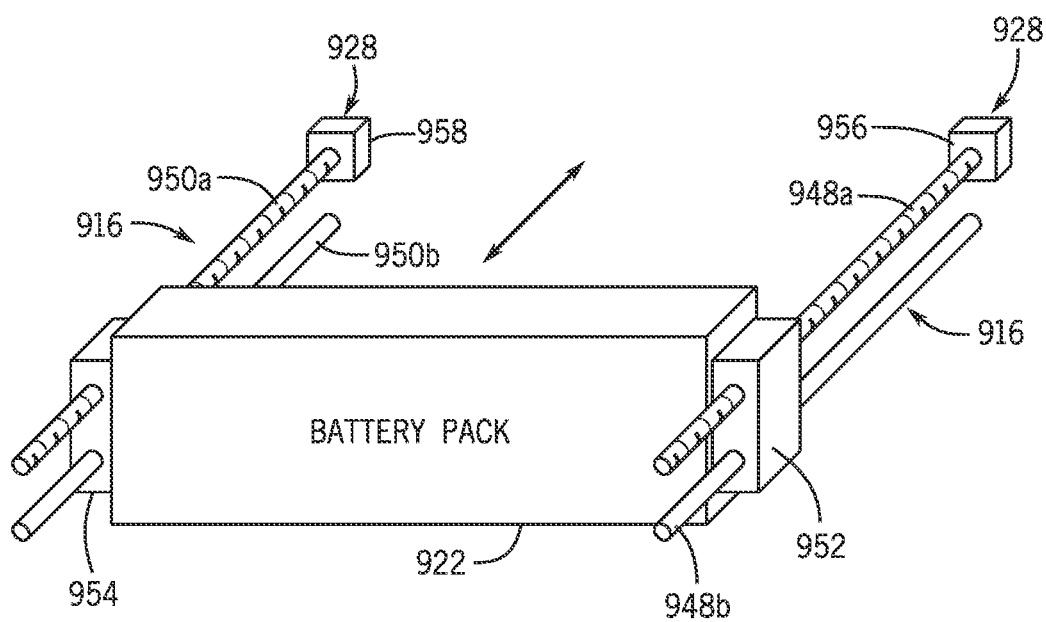
FIG. 9 is a schematic of one example of an assembly of a battery pack, actuator, and guideway according to the present disclosure.
Figure 10:
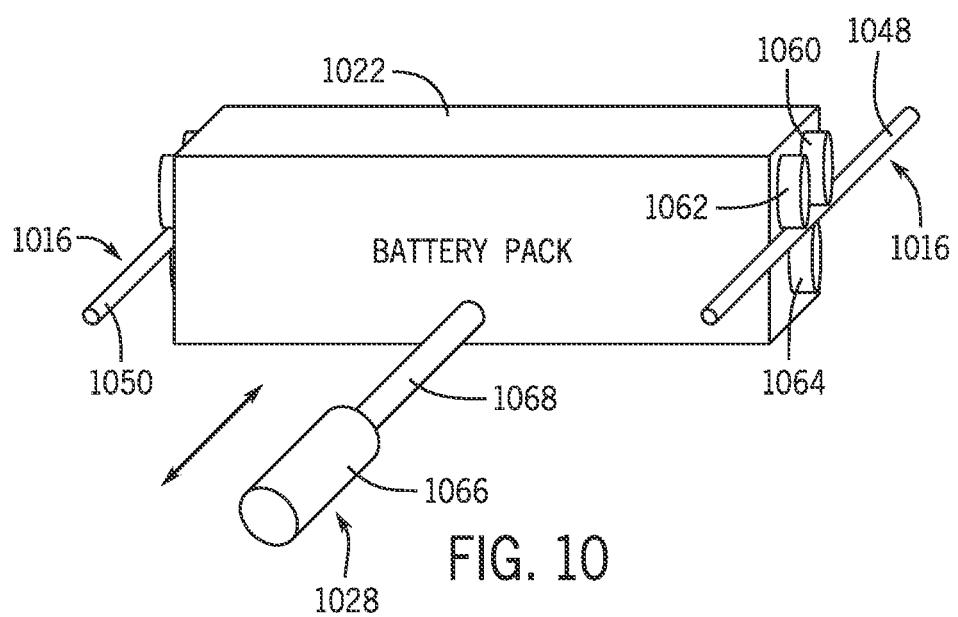
FIG. 10 is a schematic of another example of an assembly of a battery pack, actuator, and guideway according to the present disclosure

FIGS. 9 and 10 show different examples of guideways and actuators that can be used in the examples of FIGS. 1-8.

FIG. 9 shows a guideway 916, which in this example comprises two pairs of vertically stacked rods 948a, 948b and 950a, 950b. Rod 948a is stacked above rod 948b, and rod 950a is stacked above rod 9050b. The upper rods 948a, 950a extend through appropriately sized holes in a respective housing 952, 954 attached to either side of the battery pack 922. The housings 952, 954 hold bearing packs and lead nuts that facilitate movement of the battery pack 922 along the guideway 916. The upper rods 948a, 950a are threaded and interact with the lead nuts such that rotation of the upper rods 948a, 950a results in translational movement of the housings 952, 954 and thus of the battery pack 922 along the rods 948a, b and 950a, b. The upper rods 948a, 950a are rotated by the actuator 928, which in this example comprises a servo motor 956, 958 associated with each respective rod 948a, 950a. The threads may have a high helix angle in order to prevent movement of the battery pack 922 when electrical power is not applied to the servo motors 956, 958. The lower rods 948b, 950b are not threaded, and the housings 952, 954 have appropriately sized holes that allow the housings 952, 954 to slide along the lower rods 948b, 950b. The lower rods 948b, 950b are optional and help support the weight of the battery pack 922. In other examples, the lower rods 948b, 950b are the threaded drive screws, and the upper rods 948a, 950a are unthreaded.

In another example, the housings 952, 954 are provided on the top and bottom of the battery pack 922, instead of on the lateral sides as shown in FIG. 9. In another example, only one drive screw is provided centrally below the battery pack 922, which is supported by a platform above the drive screw. Additional support rods may be provided below the platform that supports the battery pack 922. In yet another example, the assembly shown in FIG. 9 could be stacked on top of another set of rods, actuators, and supports, with the lower rods extending perpendicular to the rods 948a,b and 950a,b shown in FIG. 9 and the entire assembly of FIG. 9 being moveable by the lower actuators along the lower set of rods. Such an arrangement would enable 2D planar movement of the battery pack 922 in the fore, aft, port, and starboard directions.

One or both ends of each of the rods 948a, 948b and 950a, 950b can be supported by supports such as blocks, braces, brackets, or the like, and one end of each of the rods can be supported by a housing of the actuator 928. The supports and/or actuator can in turn be supported by the hull 15, 115 or suspended from the underside of the main deck 14, 114 in the examples of FIGS. 1-4. The supports and/or actuator can be supported by the inner lower surface or suspended from the inner upper surface of the hulls 242, 244 in the example of FIGS. 5 and 6. The supports and/or actuator can be supported by the platform 346 or suspended from the lower surface of the main deck 314 in the example of FIGS. 7 and 8.

FIG. 10 shows an example in which the battery pack 1022 is supported by a guideway 1016 comprising two rods 1048, 1050. A pair of running wheels 1060, 1062 is rotatably provided on the battery pack 1022, which running wheels 1060, 1062 are supported above the rod 1048. A similar pair of running wheels is provided on the opposite lateral side of the battery pack 1022, above the rod 1050. The running wheels 1060, 1062 may be concave to prevent derailment. An up-stop wheel 1064, which may also be concave to prevent derailment, is also rotatably provided on the battery pack 1022, and supported below the rod 1048. A similar up-stop wheel is provided on the opposite lateral side of the battery pack 1022, below the rod 1050. The battery pack 1022 moves along the guideway 1016 by rolling of the wheels 1060, 1062, 1064 along the rods 1048, 1050. Such movement is in response to activation of the actuator 1028, which may be an electric or hydraulic linear actuator having a cylinder 1066 and a rod 1068, the latter of which is coupled to the battery pack 1022. Instead of concave wheels, side friction wheels could instead be provided on the sides of the rods 1048, 1050.

In another example, the actuator is a rotary actuator coupled to one of the wheels 1060, 1062, 1064 on each side of the battery pack 1022, which are capable of moving the battery pack 1022 along the guideway 1016 due to friction between the driven wheels and the rods 1048, 1050. In this case, the linear actuator 1028 shown in FIG. 10 is not required.

One or both ends of each of the rods 1048, 1050 can be supported by supports such as blocks, braces, brackets, or the like. The supports can in turn be supported by the hull 15, 115 or suspended from the underside of the main deck 14, 114 in the examples of FIGS. 1-4. The supports can be supported by the inner lower surface or suspended from the inner upper surface of the hulls 242, 244 in the example of FIGS. 5 and 6. The supports can be supported by the platform 346 or suspended from the lower surface of the main deck 314 in the example of FIGS. 7 and 8.

Although linear and rotary actuators are described herein above, in other examples, actuators such as cogged/toothed belt drives, rack and pinion drives, or other known assemblies could be used. In some examples, an actuator and guideways could be stacked on top of a platform that is itself movable along a guideway, in order to provide movement of a single battery pack in four directions.

Figure 12:
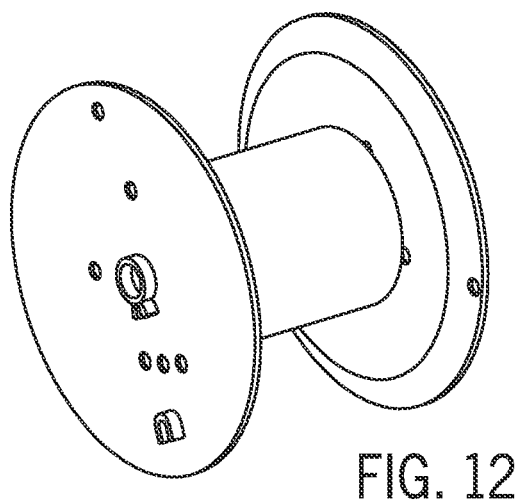
FIGS. 12-14 show examples of cable maintenance means according to the present disclosure.
Figure 13:
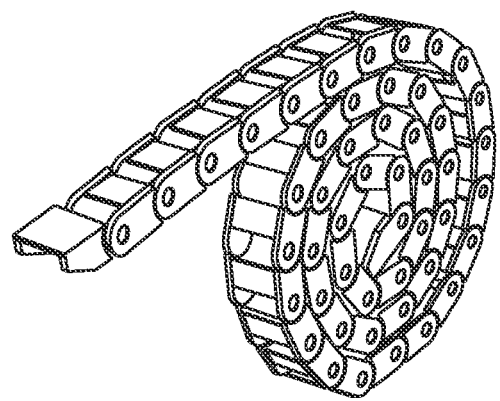
Figure 14:
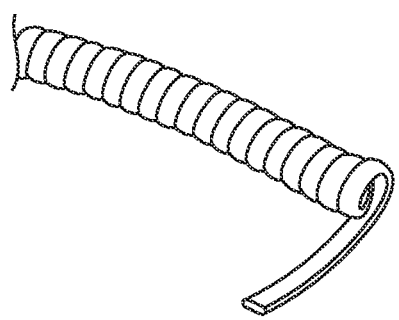

The cable maintenance means is any assembly that controls movement of the electrical cables 36, 38, 40 136, 138, 336, 338, 340 as the battery packs to which the electrical cables are connected move along their respective guideways. The cable maintenance means are installed between the respective battery pack and the power distribution box 34, 134, 334. The cable maintenance means may be a driven or spring-loaded spool about which the electrical cables are wound and unwound (FIG. 12), a plastic chain with a predetermined bend radius to which the electrical cable is attached (FIG. 13), or a sheathing around the electrical cable that causes it to coil into a helix when tension is released (FIG. 14).

In another example, the guideways are energized or grounded and the brush of the actuator slides along the energized guideway.

The other components associated with the battery packs and actuators, such as the power distribution box, the electrical cables, and the cable maintenance means, as well as several other components about to be described with respect to FIG. 11, can be supported in the same manner as described hereinabove, namely, supported on the upper surface of the structure below the given component and/or suspended from the lower surface of the structure above the given component.

Figure 11:
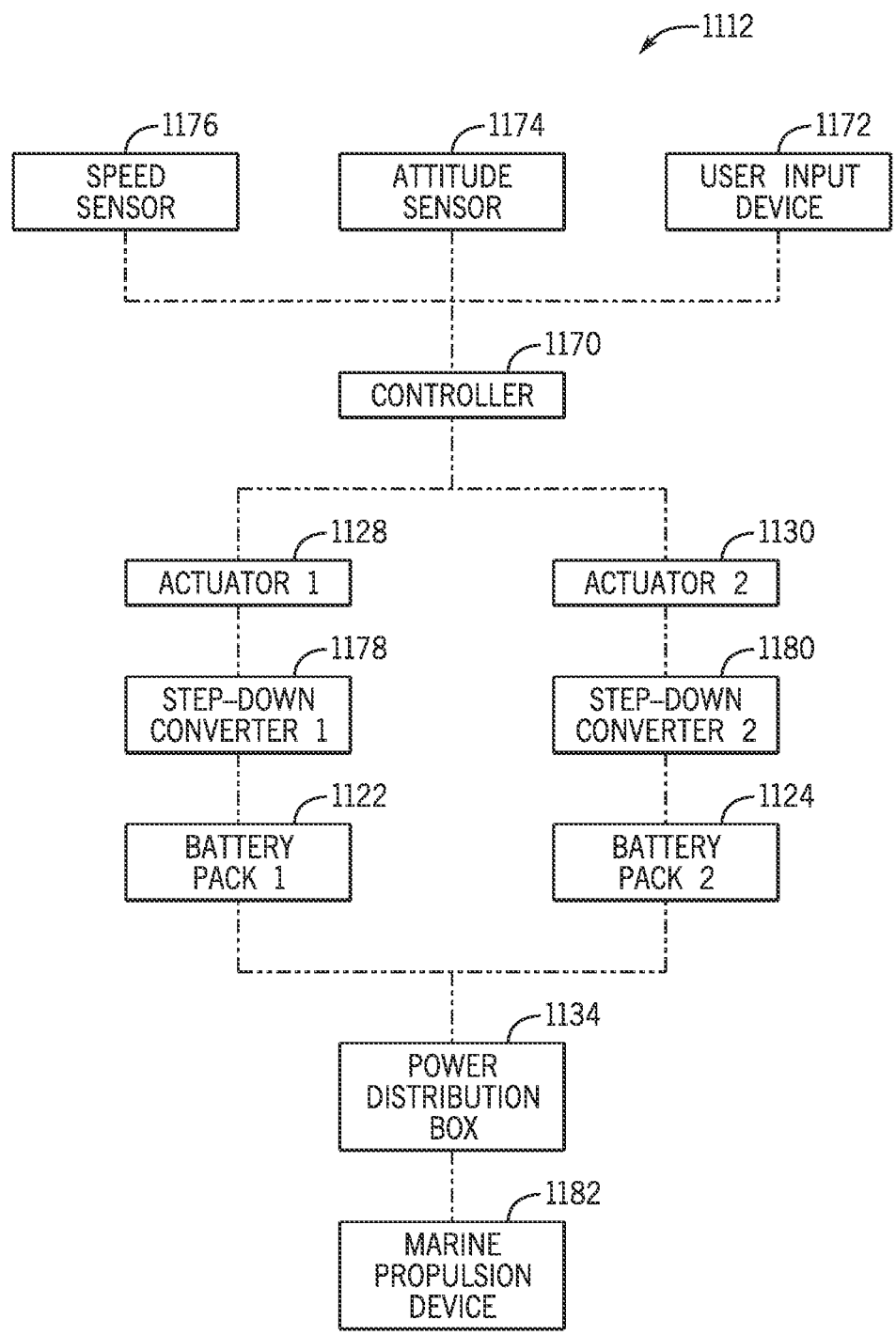
FIG. 11 is a schematic of a system for relocating battery packs on a boat.

Turning to FIG. 11, a schematic of the electrical and/or signal connections between the components of the systems described hereinabove is provided. For brevity's sake, the system will be referred to as "system 1112," but it should be understood that this diagram applies to each of the systems 12, 112, 212, 312 described hereinabove. Further, the battery packs, actuators, and power distribution box will all be labeled with a number beginning with "11," it being understood that these elements are the same as those referred to by the same name and last two digits as the elements in FIGS. 1-10.

The system 1112 comprises a controller 1170 electrically and/or signally coupled with the first actuator 1128 and the second actuator 1130. Such connection may be wired, such as by way of a direct electrical connection or a network bus, or wireless, such as by way of radio frequency communication. Suitable wired and wireless communication frameworks include the NMEA 2000 framework, controller area network (CAN) bus, cellular, WiFi, Bluetooth, Bluetooth Low Energy, Zigbee, or other suitable networks. The controller 1170 includes a processing system, a storage system accessible by the processing system, and an input/output (I/O) interface, which relays information to and from the processing system. The processing system can comprise a microprocessor, including a control unit and a processing unit, and other circuitry, such as semiconductor hardware logic, that retrieves and executes software from the storage system. The storage system can comprise any storage media readable by the processing system and capable of storing software. The storage system can include volatile and non-volatile, removable and non-removable media implemented in any method or technology for storage of information, such as computer-readable instructions, data structures, software modules, or other data. The processing system loads and executes software from the storage system, such as software programmed with one or more algorithms for relocating battery weight on the boat 10, which directs the processing system to operate as described herein below in further detail. In one example, the controller 1170 is (or is part of) a helm control module, a propulsion control module, or other known module for use on a boat. Note that the controller 1170 is not shown as being connected to every component in the diagrams provided herein, but the controller 1170 is in fact directly or indirectly electrically and/or signally connected to each component that it is described as controlling or from which it receives information.

A user input device 1172 is electrically and/or signally coupled with the controller 1170. The user input device 1172 can be a button, a switch, a keypad, a keyboard, a touch screen, a remote control device, or another similar user input device dedicated to controlling the distribution of battery weight on the boat 10. Additionally or alternatively, the user input device may be a user's personal smart phone or tablet, which runs an application that allows the user to control the distribution of battery weight on the boat 10 via the controller 1170. Thus, the user input device can be wired/cabled to the controller 1170 or in wireless communication therewith. The controller 1070 is configured to control the first actuator 1128 to move the first battery pack 1122 along the first guideway in response to an input to the user input device 1172 so as to relocate the weight of the first battery pack 1122 under the main deck. The controller 1070 is also configured to control the second actuator 1130 to move the second battery pack 1124 along the second guideway in response to the input to the user input device 1172 so as to relocate the weight of the second battery pack 1124 under the main deck. If additional actuators are provided for moving battery packs on the boat, the controller 1170 is coupled to and controls those actuators as well to relocate the weight of the battery pack(s) associated therewith. Various options for inputs to the user input device 1172 will be described herein below.

In the example shown in FIG. 11, in which the controller 1170 is electrically and/or signally coupled with the user input device 1172 and with the first actuator 1128 and second actuator 1130, the system 1112 may further comprise an attitude sensor 1174 electrically and/or signally coupled with the controller 1170. The attitude sensor 1174 provides information related to an angle of the main deck of the boat with respect to a stationary plane. For example, the attitude sensor 1174 may be an angular MEMS accelerometer; a MEMS gyrometer; an attitude and heading reference system (AHRS) that provides 3D orientation of the boat by integrating gyroscopic measurements, accelerometer data, and magnetometer data; a motion reference unit (MRU); an inertial measurement unit (IMU) or any combination of sensors capable of measuring or providing information related to pitch/roll and or trim/list of the boat 10.

The controller 1170 is configured to control the first actuator 1128 to move the first battery pack 1122 along the first guideway in response to the input to the user input device 1172 and in response to the information from the attitude sensor 1174. Similarly, the controller 1170 is configured to control the second actuator 1130 to move the second battery pack 1124 along the second guideway in response to the input to the user input device 1172 and in response to the information from the attitude sensor 1174. The controller 1170 is similarly configured with respect to any other movable battery packs on the boat 10.

A speed sensor 1176 is also electrically and/or signally coupled with the controller 1170. The speed sensor 1176 can be a pitot tube or paddle wheel sensor measuring a speed of the boat 10 or a global positioning system receiver that calculates boat speed based on the change in GPS position over time. In some examples, the controller 1170 may control the first and second actuators 1128, 1130 (an any other actuators for moving battery packs) in response to boat speed in combination with information from the attitude sensor 1174; boat speed in combination with input to the user input device 1172; or all three of boat speed, information from the attitude sensor 1174, and inputs to the user input device 1172.

The user input device 1172 may be configured to provide the operator with a few or many different options for relocating the weight of one or more of the battery packs below the main deck. For example, the user input device may have wakeshaping options, stability options, trailering options, efficiency options, and manual options. Each will be described in turn.

For wakeshaping, it may be desired to distribute the weight on the boat 10 in particular ways to create a wake having a certain shape. For example, to create a taller wake, both longitudinally movable battery packs 22, 24 122, 222, 224, 322, 324 may be moved toward the aft end of the boat 10. To create an even taller wake, one longitudinally movable battery pack may be moved to the front or center of the boat 10, and the other longitudinally movable battery pack moved to the aft end of the boat 10. If a longer wake is desired, both longitudinally movable battery packs may be moved toward the center of the boat 10. Different hull configurations may require different weight distribution in order to create the desired wake shape and the above are just some examples. In any case, the user input device 1172 may be configured to allow the user to select which type of wake the user would like to be created. The controller 1170 is configured to move the battery packs as required along their respective guideways in order to achieve the selected wake shape.

For stability, it may be desired counteract pitch/trim or roll/list of the boat 10. For example, if the attitude sensor 1174 reports a sustained list to port, the controller 1170 may be configured to move the laterally moveable battery pack 26, 1243, 26 to the starboard side of the boat 10 to counteract the list. If the attitude sensor 1174 reports a sustained trim fore or aft, the controller 1170 may be configured to move the longitudinally movable battery packs 22, 24 122, 222, 224, 322, 324 in the opposite direction. Such relocation of battery weight might help to balance the weight of many passengers all crowded on one side or end of the boat 10 or the weight of equipment that is non-uniformly distributed on the boat 10, improving handling of the boat 10. In instances in which the actuators are fast enough, it may be possible to counteract pitch and/or roll almost immediately instead of only sustained list or trim. This may increase efficiency as the trim cylinders of the marine propulsion devices and trim tabs on the boat won't need to actively resist the water as often to maintain a desired attitude of the boat 10. The user input device 1172 may be configured with an option or options for turning on or off such stability control and/or setting the sensitivity of same (e.g., to counteract sustained list/trim or to counteract pitch/roll in real-time or somewhere in between).

As far as trailering is concerned, the input device 1172 may be configured to present a "trailering" option for selection by the user. If this option is selected, the battery packs may all be moved to a location where their weight would be located over the axles of a trailer. The user could program the controller 1170 to know what location along the guideways corresponds to such a position over the axles. This might allow a lesser powered truck or a car to tow a trailer with the boat 10 on it. This might also allow a vehicle with a lower tongue-weight rating to tow a trailer with the boat 10 on it because it moves the weight off the towing vehicle's chassis and onto the trailer's axles.

Efficiency of the boat 10, in terms of electrical power required to move through the water at a given speed, may be affected by changing the boat's center of gravity as well. For instance, at low speeds, forward thrust from a rear-mounted propulsor causes bow rise, creating inefficiency and low visibility. By shifting the weight of the longitudinally movable battery packs 22, 24 122, 222, 224, 322, 324 toward the bow, the center of gravity can be shifted toward the fore end of the boat 10 to counteract such bow rise. The controller 1170 may be configured to use information from the speed sensor 1176 to determine when the boat 10 is travelling at less than a threshold speed, below which such bow rise is more likely to occur. Further, the controller 1170 can use information from the attitude sensor 1174 to double-check if such bow rise is actually occurring. The controller 1170 can be configured to shift the weight of the longitudinally movable battery packs toward the aft end of the boat 10 as the boat picks up speed, and to stop the battery packs when the weight is more or less concentrated in the center of the boat 10. Such functionality can be turned on or off by appropriate selection via the user input device 1172.

In other examples, the weight of the battery packs can be relocated manually via the user input device 1172. In such examples, the user input device 1172 can still be coupled to the controller 1170, which then controls the actuators 1128, 1130 to move the battery packs 1122, 1124. Alternatively, the user input device 1172 can be directly electrically and/or signally coupled with the first actuator 1128 and/or the second actuator 1130, and the first and/or second actuator 1128, 1130 is configured to move the first and/or second battery pack 1122, 1124 along the respective first and/or second guideway in response to an input to the user input device 1172. For example, the user input device 1172 may simply be a first switch that provides power to the motor of the first actuator 1128 to move the first battery pack 1122 in one direction or the other and a second switch that provides power to the motor of the second actuator 1130 to move the second battery pack 1124 in one direction or the other. In such an example, the controller 1170 would not be required.

As shown in FIG. 11, the system 1112 further comprises a step-down converter 1178 electrically coupled between the first battery pack 1122 and the first actuator 1128 and a step-down converter 1180 electrically coupled between the second battery pack 1124 and the second actuator 1130. This allows the high-voltage battery packs 1122, 1124 to provide power to the first and second actuators 1128, 1130. In another example, one step-down converter coupled to one of the battery packs 1122 or 1124 powers both the first and second actuators 1128, 1130. In yet another example, a separate battery or other type of power source is provided for the first and second actuators 1128, 1130.

A marine propulsion device 1182, such as an electric outboard motor, an electric stern drive, an electric pod drive, or the like, is also provided on the boat 10. The primary purpose of the battery packs 1122, 1124 is to power the marine propulsion device 1182 (of which there may be more than one) and other high-voltage loads on the boat 10. However, by providing the step-down converters 1178, 1180, not only is the marine propulsion device 1182 on the boat powered by the first battery pack 1122, but also the first actuator 1128 is powered by the first battery pack 1122 (and same for the second actuator and second battery pack).

The above-noted functions achievable due to movement of the battery packs are more efficiently achieved than with current systems including water tanks or heavy bags for ballasting. Water tanks take a long time to fill, and heavy bags are difficult to move. Further, both add weight to the boat that is not otherwise necessary, reducing efficiency. On the other hand, the battery packs are components already installed on the boat and required for powering electrical loads. Further, the density of many batteries configured to power marine drives is already much greater than the density of water. Thus, the present systems are able to redistribute the center of gravity more quickly and using less space than in prior systems.

In the above description, certain terms have been used for brevity, clarity, and understanding. No unnecessary limitations are to be inferred therefrom beyond the requirement of the prior art because such terms are used for descriptive purposes and are intended to be broadly construed. The order of method steps or decisions shown in the Figures and described herein are not limiting on the appended claims unless logic would dictate otherwise. It should be understood that the decisions and steps can be undertaken in any logical order and/or simultaneously. The different systems and methods described herein may be used alone or in combination with other systems and methods. It is to be expected that various equivalents, alternatives and modifications are possible within the scope of the appended claims.

What is claimed is:

1. A boat comprising:
a main deck;
a first guideway installed under the main deck;
a first battery pack coupled to the first guideway under the main deck;
a first actuator configured to move the first battery pack along the first guideway so as to relocate the weight of the first battery pack under the main deck;
a user input device electrically and/or signally coupled with the first actuator, wherein the first actuator is configured to move the first battery pack along the first guideway in response to an input to the user input device;
a controller electrically and/or signally coupled with the user input device and with the first actuator; and
an attitude sensor electrically and/or signally coupled with the controller, the attitude sensor providing information related to an angle of the main deck with respect to a stationary plane;

wherein the controller is configured to control the first actuator to move the first battery pack along the first guideway in response to the input to the user input device and in response to the information from the attitude sensor.

2. The boat of claim 1, further comprising:
a second guideway installed under the main deck;
a second battery pack coupled to the second guideway; and
a second actuator configured to move the second battery pack along the second guideway.

3. The boat of claim 2, wherein the first and second guideways and the first and second actuators are configured for movement of the respective first and second battery packs in a fore-aft direction of the boat.

4. The boat of claim 3, further comprising a pair of hulls supporting the main deck;
wherein the first guideway and the first battery pack are located within a first hull of the pair of hulls; and
wherein the second guideway and the second battery pack are located within a second hull of the pair of hulls.

5. The boat of claim 2, wherein the first guideway and the first actuator are configured for movement of the first battery pack in a fore-aft direction of the boat; and
wherein the second guideway and the second actuator are configured for movement of the second battery pack in a port-starboard direction of the boat.

6. The boat of claim 2, further comprising:
a platform located below the main deck; and
a pair of hulls supporting the platform;
wherein the first and second guideways and the first and second battery packs are located between the platform and the main deck.

7. The boat of claim 1, further comprising a stationary power distribution box electrically connected to the first battery pack.

8. The boat of claim 7, further comprising:
a first electrical cable coupling the first battery pack to the power distribution box; and
first cable maintenance means controlling movement of the first electrical cable as the first battery pack moves along the first guideway.

9. A boat comprising:
a main deck;
a first guideway installed under the main deck;
a first battery pack coupled to the first guideway under the main deck;
a first actuator configured to move the first battery pack along the first guideway so as to relocate the weight of the first battery pack under the main deck; and
a step-down converter electrically coupled between the first battery pack and the first actuator;
wherein the first actuator is powered by the first battery pack; and
wherein a marine propulsion device on the boat is powered by the first battery pack.

10. A system for a boat, the system comprising:
a first guideway installed under a main deck of the boat;
a first battery pack coupled to the first guideway under the main deck;
a first actuator configured to move the first battery pack along the first guideway;
a controller electrically and/or signally coupled with the first actuator; and
an attitude sensor electrically and/or signally coupled with the controller, the attitude sensor providing information related to an angle of the main deck with respect to a stationary plane;
wherein the controller is configured to control the first actuator to move the first battery pack along the first guideway in response to the information from the attitude sensor so as to relocate the weight of the first battery pack under the main deck.

11. The system of claim 10, further comprising:
a second guideway installed under the main deck;
a second battery pack coupled to the second guideway; and
a second actuator configured to move the second battery pack along the second guideway;
wherein the controller is configured to control the second actuator to move the second battery pack along the second guideway in response to the information from the attitude sensor so as to relocate the weight of the second battery pack under the main deck.

12. The system of claim 11, wherein the first and second guideways and the first and second actuators are configured for movement of the respective first and second battery packs in a fore-aft direction of the boat.

13. The system of claim 12, wherein the first guideway and the first battery pack are located within a first hull supporting the main deck, and the second guideway and the second battery pack are located within a second hull supporting the main deck.

14. The system of claim 11, wherein the first guideway and the first actuator are configured for movement of the first battery pack in a fore-aft direction of the boat; and
wherein the second guideway and the second actuator are configured for movement of the second battery pack in a port-starboard direction of the boat.

15. The system of claim 10, further comprising a stationary power distribution box electrically connected to the first battery pack.

16. The system of claim 15, further comprising:
a first electrical cable coupling the first battery pack to the power distribution box; and
first cable maintenance means controlling movement of the first electrical cable as the first battery pack moves along the first guideway.

17. The system of claim 10, further comprising a user input device electrically and/or signally coupled with the controller;
wherein the controller is configured to control the first actuator to move the first battery pack along the first guideway in response to an input to the user input device and in response to the information from the attitude sensor.

18. The system of claim 10, further comprising a step-down converter electrically coupled between the first battery pack and the first actuator;
wherein the first actuator is powered by the first battery pack; and
wherein a marine propulsion device on the boat is powered by the first battery pack.

19. A system for a boat, the system comprising:
a first guideway installed under a main deck of the boat;
a first battery pack coupled to the first guideway under the main deck;
a first actuator configured to move the first battery pack along the first guideway;
a controller electrically and/or signally coupled with the first actuator; and a sensor electrically and/or signally coupled with the controller;

wherein the controller is configured to control the first actuator to move the first battery pack along the first guideway in response to information from the sensor so as to relocate the weight of the first battery pack under the main deck;

wherein the sensor provides information related to a speed of the boat to the controller; and wherein the controller is configured to control the first actuator to move the first battery pack along the first guideway dependent on the speed of the boat as compared to a threshold speed.

20. The system of claim 19, wherein the controller is configured to control the first actuator to move the first battery pack toward a bow of the boat in response to the speed of the boat being less than the threshold speed; and wherein the controller is configured to control the first actuator thereafter to move the first battery pack aftward to a longitudinal center of the boat in response to the speed of the boat rising above the threshold speed.

21. A boat comprising:

a main deck;

a first guideway installed under the main deck;

a first battery pack coupled to the first guideway under the main deck;

a first actuator configured to move the first battery pack along the first guideway so as to relocate the weight of the first battery pack under the main deck;

a controller electrically and/or signally coupled with the first actuator; and a sensor electrically and/or signally coupled with the controller, the sensor providing information about the boat to the controller;

wherein the controller is configured to control the first actuator to move the first battery pack along the first guideway in response to the information from the sensor.

22. The boat of claim 21, wherein the sensor provides information related to a speed of the boat to the controller; and wherein the controller is configured to control the first actuator to move the first battery pack along the first guideway dependent on the speed of the boat as compared to a threshold speed.

23. The boat of claim 22, wherein the controller is configured to control the first actuator to move the first battery pack toward a bow of the boat in response to the speed of the boat being less than the threshold speed; and wherein the controller is configured to control the first actuator thereafter to move the first battery pack aftward to a longitudinal center of the boat in response to the speed of the boat rising above the threshold speed.

* * * * *